US006908128B2

(12) United States Patent
Strong

(10) Patent No.: US 6,908,128 B2
(45) Date of Patent: Jun. 21, 2005

(54) EXTERNAL PROTECTION SYSTEM FOR A VEHICLE

(76) Inventor: Russell W. Strong, 410 S. Pitkin Rd., Craftsbury Common, VT (US) 05827

( * ) Notice: Subject to any disclaimer, the term of this patent is extended or adjusted under 35 U.S.C. 154(b) by 0 days.

(21) Appl. No.: 10/781,514

(22) Filed: Feb. 18, 2004

(65) Prior Publication Data

US 2004/0160050 A1 Aug. 19, 2004

Related U.S. Application Data

(60) Provisional application No. 60/448,081, filed on Feb. 18, 2003.

(51) Int. Cl.$^7$ ............................................... B60R 19/38
(52) U.S. Cl. ....................................... 293/128; 293/126
(58) Field of Search ................................ 293/102, 118, 293/119, 120, 126, 127, 128, 142; 296/187.09, 187.11, 187.12

(56) References Cited

U.S. PATENT DOCUMENTS

| 4,474,257 | A | * | 10/1984 | Lee | 293/118 |
| 4,995,660 | A | * | 2/1991 | Horansky et al. | 293/132 |
| 5,033,569 | A | * | 7/1991 | Hayes | 293/118 |
| 5,810,427 | A | * | 9/1998 | Hartmann et al. | 293/119 |
| 6,290,307 | B1 | * | 9/2001 | Poertzgen et al. | 303/115.4 |
| 6,575,509 | B1 | * | 6/2003 | Golden | 293/119 |

* cited by examiner

Primary Examiner—Lori L. Coletta
(74) Attorney, Agent, or Firm—John S. Artz; Artz & Artz, P.C.

(57) ABSTRACT

An external protection system for a vehicle includes a plurality of external guards in communication with a passenger compartment. The plurality of guards are spaced a distance away from the passenger compartment such that a crush zone exists between each of the plurality of guards and the passenger compartment. This provides a lightweight vehicle with an increased level of protection.

27 Claims, 6 Drawing Sheets

EXTERNAL PROTECTION SYSTEM FOR A VEHICLE

CROSS-REFERENCE TO RELATED APPLICATIONS

The present invention claims priority from U.S. Provisional Application Ser. No. 60/448,081, which was filed on Feb. 18, 2003, for an invention entitled "External Protection System for a Vehicle."

BACKGROUND

In today's operation of smaller or lighter vehicles in mixed traffic with larger and heavier vehicles it is generally understood that the smaller and lighter vehicles and their occupants carry a higher risk of damage and injury than do the larger and heavier vehicles and their occupants. An extreme illustration occurs where a small sports car is broad sided by a loaded semi-tractor trailer truck at full speed. There is also much concern over disparate contact heights for front and rear impacts. Due to these issues, the buying public has heavily migrated to purchasing larger and safer vehicles (by size and weight, and perceptions from a higher ride height). Yet, today there is critical need for improving the fuel efficiency of vehicle traffic. Significant efficiency gain could come from changing commuters from transporting one or two people (300 lbs.) in larger vehicles (5,000 lbs.), to transporting the same commuters (300 lbs.) in lighter and more aerodynamic vehicles (1,500 lbs, for instance).

However, the realities stated above on the public perceptions of personal safety in mixed traffic and the realities of the trucking industry's continued existence on the roads, all have actually led to a cultural situation seriously limiting acceptance of present fuel efficient vehicles. By simple physics, a larger mass impacting a smaller mass, will impart greater energy into the smaller mass. This results in either: (1) a greater rate of deceleration of the smaller mass as the larger mass is decelerated by the impact, which then accelerates the smaller vehicle in the larger mass' original direction or (2) the smaller mass absorbs the larger energy in the crushing of the vehicle body of the smaller mass. Hence, the slowing of deceleration and absorbing of energy is the lighter vehicle's defense. These are the principles of both the move to larger vehicles for safety and of the move to airbag systems.

Much work has been done in designing a vehicle's ability to absorb frontal and rear impact with large and controlled crush zones. However, in a side impact scenario, today's vehicles position the occupant's body less than 8 inches from the point of impact of a large, high speed vehicle. This leaves little room for either a crush zone or the adequate operation of an airbag system. Lighter three and four wheel vehicle concepts have been advanced, including positioning the vehicle's occupants in tandem and providing greater distance from the side points of the tires to the occupants. However, the designs have not provided any significant advance in crash protection. The vehicles are still highly vulnerable in traffic with large trucks, and even more so perceptually. If a lighter vehicle is to provide equal protection to that of larger vehicles on the road, it must be designed to absorb much greater impact, and the vehicle must readily communicate its safety advantages to the potential buying public in order to achieve acceptance and hence shift drivers to the use of lighter vehicles, thus positively impacting the overall fuel efficiency of the transportation fleet.

Vehicles are available with front guards, known as brush guards or kangaroo guards (in Australia). These guards are for the purpose of keeping animals from coming over the hood of the vehicle in a contact situation and for protecting the vehicle from damage due to contact with brush and small trees during off-road operation. While today most are of cosmetic function only, functional ones are only on larger vehicles and are not for the purpose of occupant crash protection from another vehicle. Rear aerodynamic devices, or spoilers are utilized as external components of vehicles for primarily cosmetic purposes, such as relating a marketing connection to racing. In cases where they are functional, they are designed for aerodynamic purposes only, and do not function as crash protection devices.

SUMMARY OF INVENTION

It is therefore an advantage of the present invention to provide an external protection system that is integrated into the design of a vehicle to provide significantly improved protection to all occupants of a lightweight vehicle and in such lightweight vehicle, to provide equal or better protection to that provided occupants of a much heavier vehicle.

It is another advantage of the present invention to provide an external protection system that is integrated into the design of a vehicle to provide significantly improved protection to all occupants of the vehicle while providing improved aerodynamics for the vehicle.

It is still another advantage of the present invention to provide an external protection system that is integrated into the design of a vehicle that does not have a significant negative impact on the vehicle's aerodynamic capabilities.

It is yet another advantage of the present invention to provide an external protection system that is integrated into the design of a vehicle that does not negatively impact side, forward, and rearward visibility from the vehicle.

It is a further advantage of the present invention to provide an external protection system that is integrated into the design of a vehicle that maximizes the vehicle's impact crush zone in the direction of the external protection system.

It is still a further advantage of the present invention to provide an external protection system that is integrated into the design of a vehicle that minimizes vehicle frontal surface area relative to air resistance to vehicle movement.

It is yet another advantage of the present invention to provide an external protection system that is integrated into the design of a vehicle that though integrated into the design of the vehicle, is discrete from the body of the vehicle, yet still located within the wheel stance width of the vehicle.

Other objects and features of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
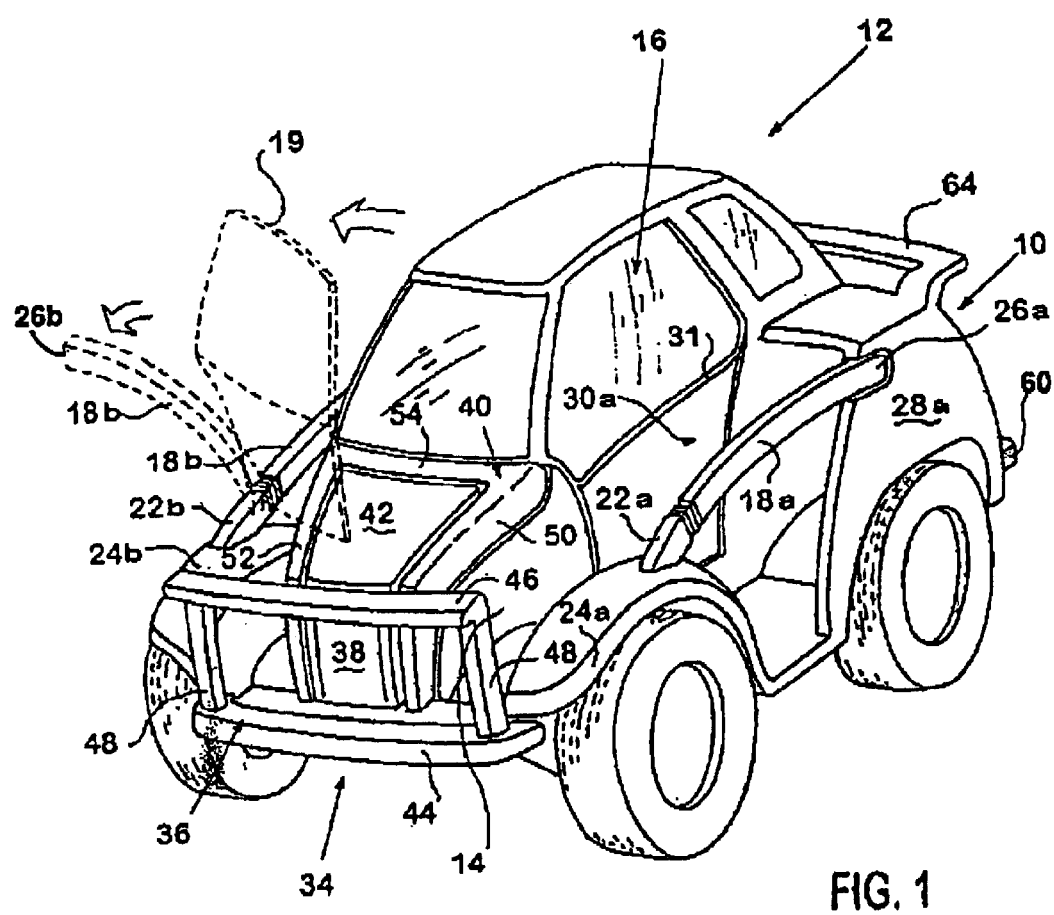
FIG. 1 is a perspective view of a vehicle employing an external protection system in accordance with one embodiment of the present invention.
Figure 2:
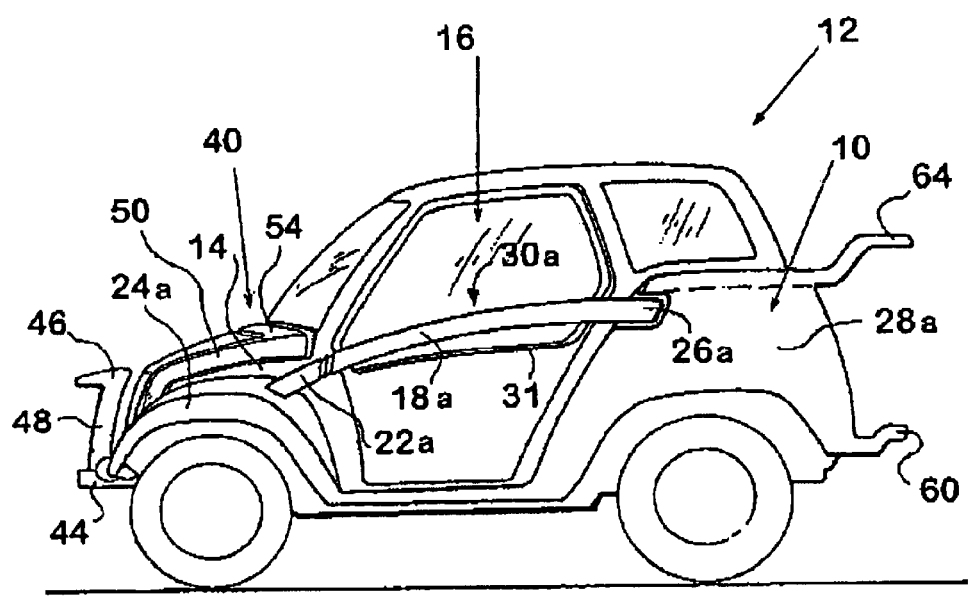
FIG. 2 is a side view of the vehicle of FIG. 1.
Figure 3:
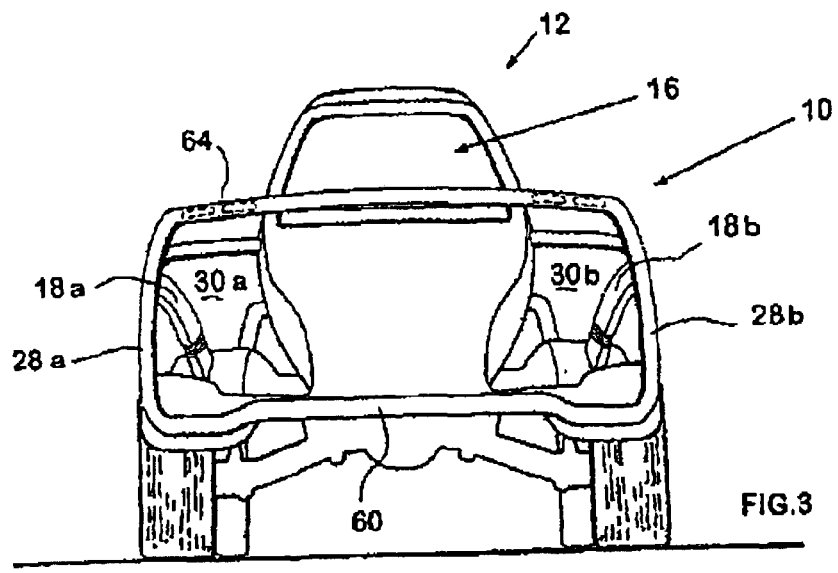
FIG. 3 is a rear view of the vehicle of FIG. 1.
Figure 4:
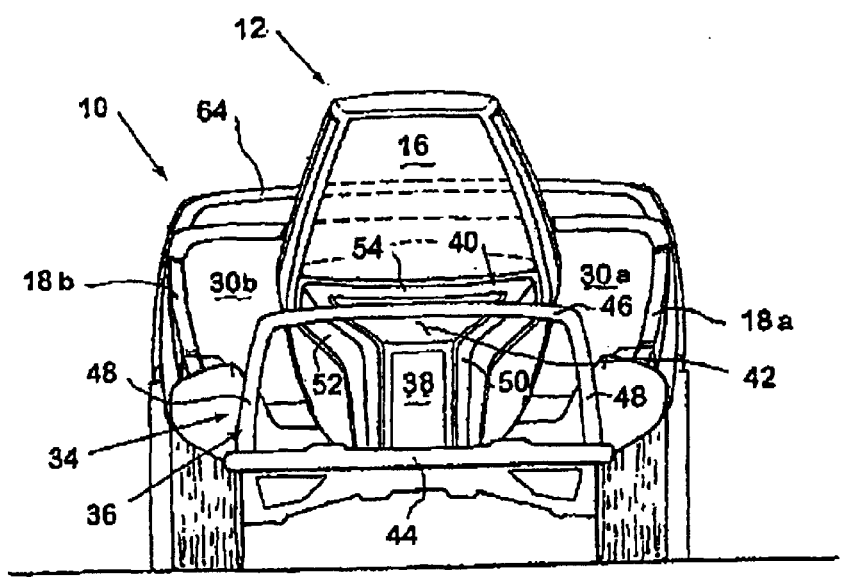
FIG. 4 is a front view of the vehicle of FIG. 1

As shown in the attached drawings, an external protection system for a vehicle is disclosed. The disclosed vehicle includes a plurality of guard rails and/or external structural surfaces that in concert with the guard rails are secured to the body of the vehicle. The plurality of guard rails and/or external structural surfaces that function in concert with the guard rails, are located around the exterior of the vehicle and are intended to provide protection to any occupants located within the passenger compartment of the vehicle in the event of a collision. While the guard rails and/or external structural surfaces are preferably secured to the body of the vehicle, they are located outwardly from an effective inner cabin which defines the passenger compartment. In other words, the guard rails and structural surfaces are spaced outwardly from the body of the passenger compartment. Because the guard rails and structural surface are preferably part of the frame of the vehicle, they can also provide increased structural integrity.

Referring now to FIGS. 1 through 4, which illustrate one embodiment of an external protection system 10 for a vehicle 12. The vehicle 12 includes a body 14, a passenger compartment 16, and a plurality of external guards. The external guards preferably consist of structural rails and structural surfaces. The location and number of external guards can vary as will be understood by one of ordinary skill in the art. Additionally, different types and different configurations of external guards may also be utilized.

As shown, the external guards, including the structural rails and the structural surfaces comprise the external protection system 10 for the vehicle 12. The external protection system 10 is intended to be styled integral with the design character of the vehicle, such that they appear to be styling features instead of protection features. In one embodiment, the external protection system 10 is spaced away from the passenger compartment 16, but within the wheelbase of the vehicle 12, such that the resulting vehicle does not appear smaller than conventional vehicles, despite the fact that it has significantly less weight, and presents significantly less frontal surface for air resistance to travel at speed. The resulting structure also provides increased fuel economy without providing the perception of a small vehicle. Further, the external protection system 10 provides equal or increased crash protection to that of larger heavier vehicles.

Referring now to the Figures, which illustrate one embodiment of an external protection system 10. The system 10 includes a first guard rail 18a, which extends generally horizontally along the driver's side of the vehicle 12. The first guard rail 18a includes a first end 22a attached to a front structural surface 24a and a second end 26a attached to a rear structural surface 28a. As shown, the first guard rail 18a and the rear structural surface 28a are spaced away from the vehicle a substantial distance in order to provide a crush zone 30a. In one embodiment, the first guard rail 18a is located generally at or above the height of the vehicle beltline 31. This provides increased structure at the beltline 31 of the vehicle 12, which provides increased protection to any occupants of the vehicle 12.

The system also includes a second guard rail 18b, which extends generally horizontally along the passenger side of the vehicle 12. The second guard rail 18b includes a first end 22b attached to a front structural surface 24b and a second end 26b attached to a rear structural surface 28b. The second guard rail 18b and the rear structural surface 28b are also spaced away from the vehicle a substantial distance in order to provide a crush zone 30b. The second guard rail 18b is also located generally at or above the height of the vehicle beltline 31. This provides increased structure at the beltline 31 of the vehicle 12, which provides increased protection to an occupant of the vehicle 12.

It will be understood that the configuration of the guard rails 18a, 18b as well as their orientation and height can vary. For example, the guard rails may alternatively be oriented in a generally vertical direction to provide additional support in the location of the a-pillar or the b-pillar. Additionally, the guard rails may be non-continuous structures that extend along the side of the vehicle. It will also be understood that the distance which the guard rails are spaced away from the passenger compartment 16 can also vary. It will also be understood that the configuration size and location of the structural surfaces can vary.

As is shown in phantom in FIG. 1, the guard rails 18a, 18b do not interfere with the entry or exit of an occupant into or from the vehicle 12. To accomplish this, in one embodiment the guard rails 18a, 18b are pivotally attached at their first ends 22a, 22b to the respective front structural surfaces 24a, 24b to allow the second ends 26a, 26b to releaseably engage the rear structural surfaces 28a, 28b and swing outwardly. After the guard rails 18a, 18b have swung outwardly, the vehicle door 19 can then be swung outwardly. Additionally, a variety of different latch mechanisms may be employed to secure the guide rails 18a, 18b to the rear structural surfaces 28a, 28b when the door is closed and allow it to open independently of or in concert with the opening of the vehicle door 19. It will also be understood that the guard rails 18a, 18b may also swing or pivot upwardly.

The rear structural surfaces 28a, 28b are also external surfaces that form in integral part of the external protection system 10. Additionally, it will be appreciated that the zones 30a, 30b that exist between the rear structural surfaces 28a, 28b and the external surface of the passenger compartment 16 can be utilized for utility purposes such as storage or the like. In other words, the guide rails 18a, 18b can be used as a support mechanism or to assist in carrying items. While the guard rails 18a, 18b and external surfaces are all located outwardly with respect to the sides of the vehicle 12, they are still located substantially within an envelope defined by the width of the stance of the wheels the vehicle 10. Thus, the external protection system 10 provides increased protection for a passenger or passengers in the passenger compartment 16, without requiring an increase in the overall width of the vehicle 12. Obviously, the external protection system 10 can be located outwardly of the wheel width as desired.

The external protection system 10 also includes a front guard 34. Again the front guard 34 is preferably located substantially within the envelope defined by the wheel width and vehicle length. The front guard 34 includes a first portion 36 that extends generally across the forward portion 38 of the vehicle 12 and a second portion 40 that extends generally rearwardly and communicates with the hood 42 of the vehicle. The first portion 36 is pivotally attached to the chassis or body 14 of the vehicle 12, as will be discussed in more detail below. The second portion 40 may be attached to the first portion 36 of the front guard 34 or may be pivotally attached to the chassis or body 14 of the vehicle 12. The front guard 34 provides additional structural protection around the passenger compartment 16 of the vehicle 12. The upper member 46 of first portion 36 of the front guard 34 is designed to flip forward in concert with the upward pivoting of the second portion 40 upon sensed impact, as discussed in more detail below.

The first portion 36 of the front guard 34 preferably includes a lower member 44, an upper member 46, and a pair of side members 48. The second portion 40 of the front guard 34 includes a first side support 50, a second side support 52, and a top portion 54, which connects the first side support 50 and the second side support 52. The first side support 50 and the second side support 52 are each pivotally attached to the lower member 44 of the first portion 36 or may be attached to the chassis or body 14 of the vehicle.

The external protection system 10 also includes a lower rear guard 60 that attaches at either end to a respective one of the rear structural surfaces 28a, 28b. The external protection system 10 also includes an upper rear guard 64, which also attaches at either end to a respective one of the rear structural surfaces 28a, 28b. Again, the lower rear guard 60 and the upper rear guard 64 are preferably located substantially within the envelope defined by both the wheel width of the vehicle 12 and the nominal vehicle length. The lower rear guard 60 and the upper rear guard 64 provide additional structural support around the passenger compartment 16 of the vehicle 12.

In operation, in the event of an accident from either side, the force of an impact crushes guide rails 18a, 18b. Because the guide rails 18a, 18b are spaced outwardly from the passenger compartment 16 a substantial distance and because of the crush resistance of guide rails 18a, 18b, the impact force on the passenger compartment 16 is reduced compared to conventional vehicles where a side impact occurs at the structure adjacent the occupant. Similarly, the front guard 34 and the upper and lower rear guard members 60, 64 provide similar protection as they are spaced away a distance from the passenger compartment 16. The same also applies to the front and rear structural surfaces 24a, 24b, and 28a, 28b for side, front and rear impacts.

Figure 5:
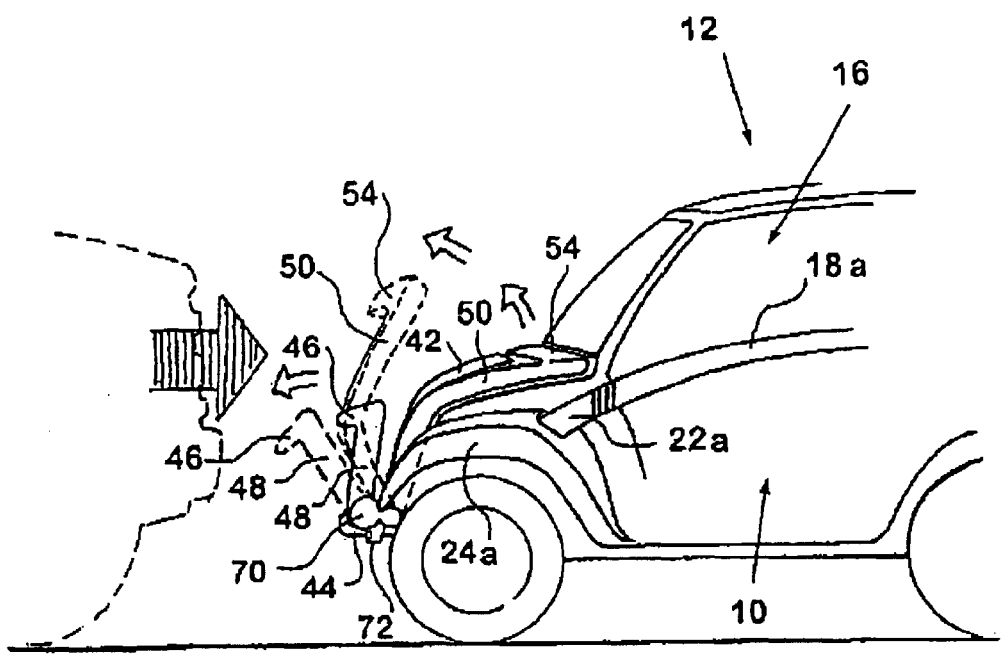
FIG. 5 is a schematic illustration of a pair of external guards of the external protection system demonstrating movement of the external guards to a protective position in accordance with one embodiment of the present invention.

Alternatively, the external protection system 10 also preferably includes an actuating mechanism 70 that activates one or more of the external guards or surfaces to better combat and dissipate forces imparted on the vehicle 12 during a crash. With respect to FIG. 5, the actuating mechanism 70 is in communication with the front guard 34 to pivot it from a normal retracted position (shown best in FIG. 1) to a deployed position. In the deployed position, the first portion 36 of the front guard 34 pivots forwardly from a generally vertical position to a position angled forwardly with respect to the forward portion 38 of the vehicle 12. This provides a further force absorption zone to minimize the amount of force applied to the passenger compartment 16 during a frontal crash. Similarly, the second portion 40 of the front guard 34 pivots upwardly and forwardly with respect to the hood 42 to provide further structural protection in the event of a frontal crash and enlarging the force absorption zone, and deflecting impacts at a higher height as might be advantageous in a collision with a moose, for instance.

The actuating mechanism 70 can be controlled in a variety of different ways to position the guide for the greatest energy absorption of an impending crash. In one embodiment, the actuating mechanism 70 is also connected to a sensor 72, which senses certain vehicle conditions and then sends a signal to the front guard 34 to move it from the retracted position to the deployed position. In one condition, the actuating mechanism 70 can be actuated when the sensor 72 detects an impending vehicle crash. Alternatively, the actuating mechanism 70 can be activated when the sensor 72 detects first impact with the vehicle 12. Further, the actuating mechanism 70 can be activated when the sensor 72 detects a roll-over condition. It will be understood that the sensor 72 can be designed to move the guard rail to the deployed condition under a variety of different conditions. While the actuating mechanism 70 is described in connection with the front guard 34, it will be appreciated that it can be applied to any portion of the external protection system 10 to move them outward for force absorption purposes.

Figure 6:
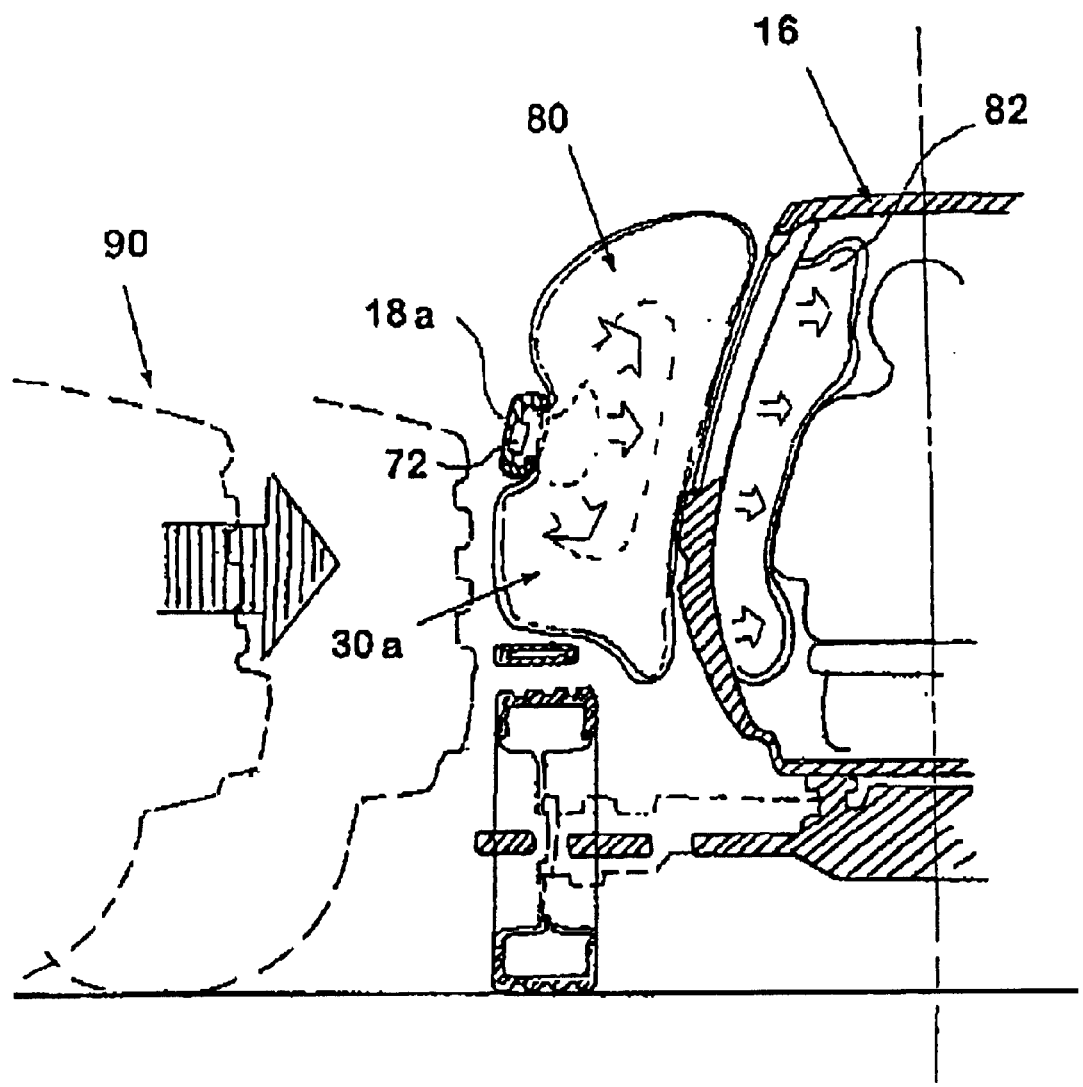
FIG. 6 is a schematic illustration of an air bag housed within an external guard in a deployed position in accordance with one embodiment of the present invention.

As shown in FIG. 6, as a further protection, some or all of the guard rails can house or carry an energy absorbing device, such as an air bag that will deploy in the event of an accident with another vehicle 90 to protect the occupants of the vehicle. This provides better protection to the passenger compartment 16 from impact with greater airbag reaction time and airbag size. The energy absorbing device, generally referred to by reference number 80, is in communication with a sensor 72 such that it is deployed under a certain sensed condition. The conditions for deployment are well known and some have been described above. In the deployed condition, the air bag fills the crush zone 30a between the guard rail 18a and the side of the passenger compartment 16. Additionally, another air bag 82 is positioned within the passenger compartment 16 to deploy in the event of a collision. Through the use of the additional outer air bag 80, the occupant is provided with significantly increased protection as compared to currently available vehicles. It is understood that this same protection advantage can also be provided within the front and rear protection rails.

Figure 7:
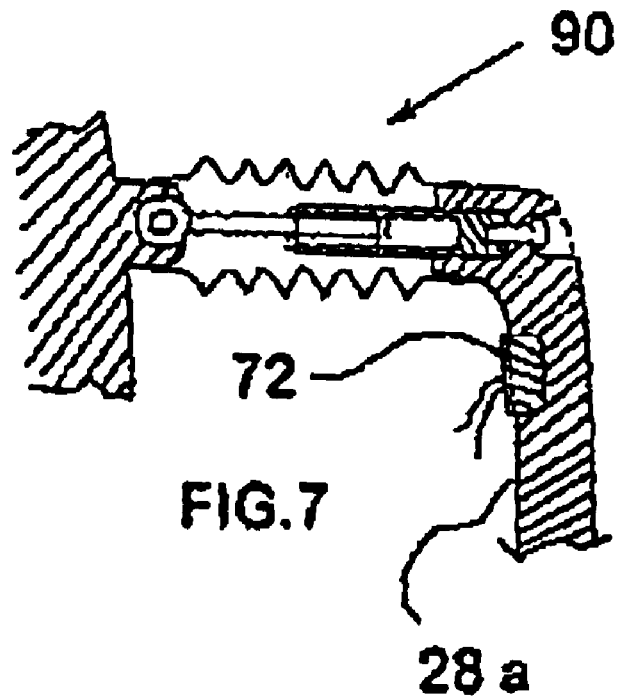
FIG. 7 is an enlarged view illustrating an exemplary attachment of a support structure surface for a vehicle in accordance with one embodiment of the present invention.
Figure 8:
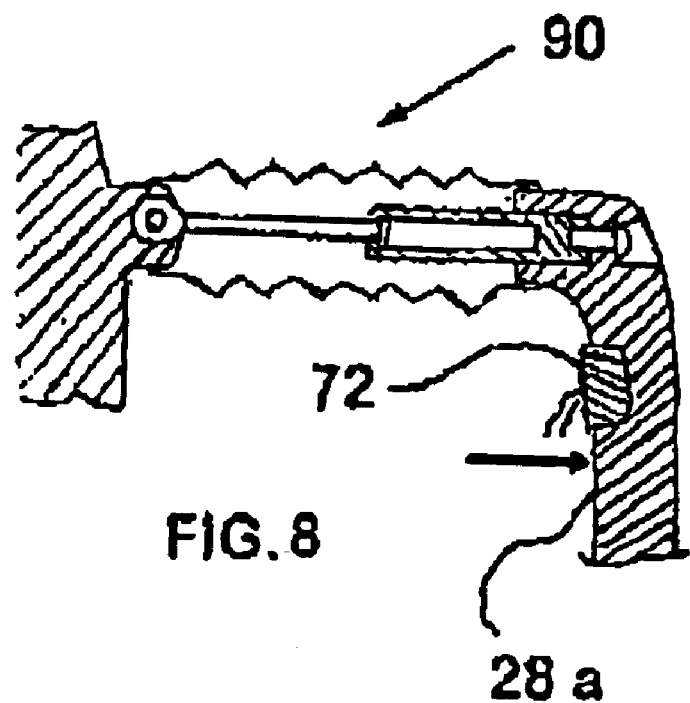
FIG. 8 is an enlarged view of the exemplary attachment of the surface support structure shown in FIG. 7, illustrating the surface support structure being moved outwardly in anticipation of an impact event so as to enhance impact absorption and vehicle safety.

Additionally, the guard rails 18a, 18b or structural surfaces can be reactive to sensed impact. For example, they may alter the rigidity of their mounting (connection to the body 14 of the vehicle 12) such as by allowing a decreased, but energy absorbing, resistance to movement. One such mechanism for altering the rigidity is through the inclusion of a shock absorber 90, as shown in FIG. 7, which allows the structural surfaces to move inwardly in the event of a vehicle impact. Alternatively, a rheomagnetic fluid can also be utilized to effect situation-specified resistance. In this instance, the fluid would be transformed from a solid structure to a fluid structure within a device to allow movement or flexibility upon demand. Additionally, similar to the front guard 34 and as shown in FIG. 8, the shock absorber 90 can be adjusted for moving the rear structure 28a outwardly in anticipation of the event of impact to provide further impact absorption and thereby increase safety of vehicle occupants. It is contemplated that the shock absorber 90 can be adjusted for moving various other suitable structural surfaces as desired. Moreover, the structural mounting can be accomplished by hydraulic, pneumatic or a variety of other suitable connections that allow for force absorption.

The disclosed concept effectively provides a cage of protection, the volume of which is configured to maximize aerodynamics. It is another advantage of the present invention to provide a protection system that maximizes the crush zone relative to frontal, side, rear, and rollover impacts with a minimum amount of frontal area to affect air drag resistance. The external protection system 10 can surround a cabin housing two occupants seated side by side dimensionally equal to that of a mini car, yet with the total vehicle protection system being dimensionally equal to a larger vehicle. Alternatively, two or more occupants can be seated in tandem.

The external guards can also be deployable to a position and locked to accommodate racks and storage needs. The external guards can also be retractable for parking service or accommodation of needs of the vehicle to fit other transportation modes (shipping, trucking, coupling on future multiple-vehicle routing/dispensing/transporting systems). The guards can also be deployable in part or in whole in such a manner to accommodate access to doors, trunks, storage or service areas.

It will be understood that any number of guard rails and/or structural surfaces may be utilized and that they may be located in a variety of different positions. The number, configuration, orientation, and combination of the guard rails, bars or structural surfaces discussed above in connection with the above drawings are merely for illustration. For example, while a plurality of horizontal bars are shown in some of the drawings, it will be appreciated that a plurality of vertical bars may also be utilized. Moreover, a combination of both horizontal and vertical bars may be employed to provide a face mask type system. The bars and surfaces may form an effectively continuous surface, or may be intermittent.

Additionally, various different types of configurations for the external protection system may be utilized. For example, the vehicle and external protection system can be configured to have the height of a sport utility vehicle as well as the width of a large sport utility vehicle or truck. Alternatively, the external protection system can be configured to have the dimensions of a compact vehicle, both in height and width. Moreover, the external protection system is preferably constructed to have a light weight so as not to have a negative impact on fuel economy. Further, the external protection system includes an aerodynamic frontal area to improve fuel efficiency as well as to allow for various styling options.

While a preferred embodiment of the present invention has been described so as to enable one skilled in the art to practice the present invention, it is to be understood that variations and modifications may be employed without departing from the purview and intent of the present invention, as defined in the following claims. Accordingly, the preceding description is intended to be exemplary and should not be used to limit the scope of the invention. The scope of the invention should be determined only by reference to the following claims.

What is claimed is:

1. An external protection system for a vehicle having a passenger compartment, the external protection comprising: a plurality of external guards in communication with said passenger compartment, said plurality of external guards being spaced a distance away from said passenger compartment such that a crush zone exists between said plurality of external guards and said passenger compartment; wherein at least one of said plurality external guards is moveable for access to said passenger compartment; wherein at least one of said plurality of external guards is moveable for access to said passenger compartment, for vehicle service, for storage or for reconfiguration for accommodating external loads or racks for load carrying and wherein said at least one of said plurality of external guards moves in conjunction with an associated vehicle door as said vehicle door is moved between an open and closed position.

2. The external protection system of claim 1, wherein at least one of said plurality of external guards consists of a structural rail.

3. The external protection system of claim 2, wherein said structural rail is integrally styled with the design character of the vehicle.

4. The external protection system of claim 1, wherein at least one of said plurality of external guards is a structural surface.

5. The external protection system of claim 4, wherein said structural surface is integrally styled with the design character of the vehicle.

6. The external protection system of claim 1, wherein at least one of said plurality of external guards consists of a combination of at least one guide rail and at least one structural surface.

7. The external protection system of claim 1, wherein at least one of said plurality of external guards can be deployed from a normal position to a protective position by an actuating mechanism for energy absorption purposes in the event of a crash.

8. The external protection system of claim 7, wherein said actuating mechanism includes one or more sensors, which can deploy said at least one external guard to said protective position when said one or more sensors detect an impending crash condition.

9. The external protection system of claim 7, wherein said actuating mechanism includes one or more sensors, which can deploy said at least one external guard to said protective position when said one or more sensors detect first collision contact.

10. The external protection system of claim 7, wherein said actuating mechanism includes one or more sensors, which can deploy said at least one external guard to said protective position when said one or more sensors detect a rollover condition.

11. The external protection system of claim 1, wherein said at least one of said plurality of external guards includes at least one airbag housed therein that can be deployed by an actuating mechanism to protect said passenger compartment from impact by absorbing force imported thereto.

12. The external protection system of claim 11, wherein said at least one airbag housed within said at least one external guard, functions for purpose of impact absorption in conjunction with at least one interior airbag within said passenger compartment.

13. The external protection system of claim 11, wherein said actuating mechanism includes one or more sensors, which can deploy said at least one airbag when said one or more sensors detect an impending crash condition.

14. The external protection system of claim 11, wherein said actuating mechanism includes one or more sensors, which can deploy said at least one airbag when said one or more sensors detect first contact collision.

15. The external protection system of claim 11, wherein said actuating mechanism includes one or more sensors, which can deploy said at least one airbag when said one or more sensors detect a rollover condition.

16. The external protection system of claim 6, wherein a combination of said at least one guard rail and said at least one structural surface, may be utilized to effect a design.

17. The external protection system of claim 1, wherein at least one of said plurality of external guards is rigidly mounted to said passenger compartment and vehicle structure.

18. The external protection system of claim 1, wherein at least one of said plurality of external guards protective guard is mounted to the vehicle by a shock absorbing system.

19. The external protection system of claim 18 wherein said shock absorbing system is a hydraulic mechanism.

20. The external protection system of claim 18, wherein said shock absorbing system is a pneumatic mechanism.

21. The system of claim 18, wherein said shock absorbing system is a rheomagnetic mechanism.

22. The external protection system of claim 18, wherein said shock absorbing system mounting is actively adjustable.

23. The external protection system of claim 18, wherein said shock absorbing system is in communication with at least one sensor to effectuate activation upon a predetermined sensed condition.

24. The external protection system of claim 1, wherein at least one of said plurality of external guards is moveable between an extended position and a retracted position.

25. The external protection system of claim 24, wherein in said extended position said at least one external guard is locked to accommodate storage.

26. The external protection system of claim 24, wherein said at least one external guard can be moved to said retraction position for reducing the size of the vehicle in connection with a vehicle where other elements adjust.

27. An external protection system for a vehicle having a passenger compartment, the external protection system comprising:

a plurality of external guards in communication with said passenger compartment, said plurality of external guards being spaced a distance away from said passenger compartment such that a crush zone exists between said plurality of external guards and said passenger compartment;

wherein at least one of said plurality of external guards protective guard is mounted to the vehicle by a shock absorbing system, said shock absorbing system mounting being actively adjustable.

* * * * *

UNITED STATES PATENT AND TRADEMARK OFFICE
CERTIFICATE OF CORRECTION

PATENT NO. : 6,908,128 B2
DATED : June 21, 2005
INVENTOR(S) : Russell W. Strong

It is certified that error appears in the above-identified patent and that said Letters Patent is hereby corrected as shown below:

Column 7,
Line 50, after "protection" insert -- system --.
Line 56, after "plurality" insert -- of --.

Column 10,
Line 1, after "vehicle" delete "in".
Line 2, delete "connection with a vehicle where other elements adjust".

Signed and Sealed this

Twenty-third Day of August, 2005

JON W. DUDAS
*Director of the United States Patent and Trademark Office*